(No Model.) 2 Sheets—Sheet 1.

M. MACLEOD.
JOINING BAR FOR UNITING GLASS AND OTHER PLATES.

No. 370,075. Patented Sept. 20, 1887.

WITNESSES:
P. F. Nagle.
Wm. H. Carson.

INVENTOR
Malcolm Macleod
per George E. Buckley
his Atty

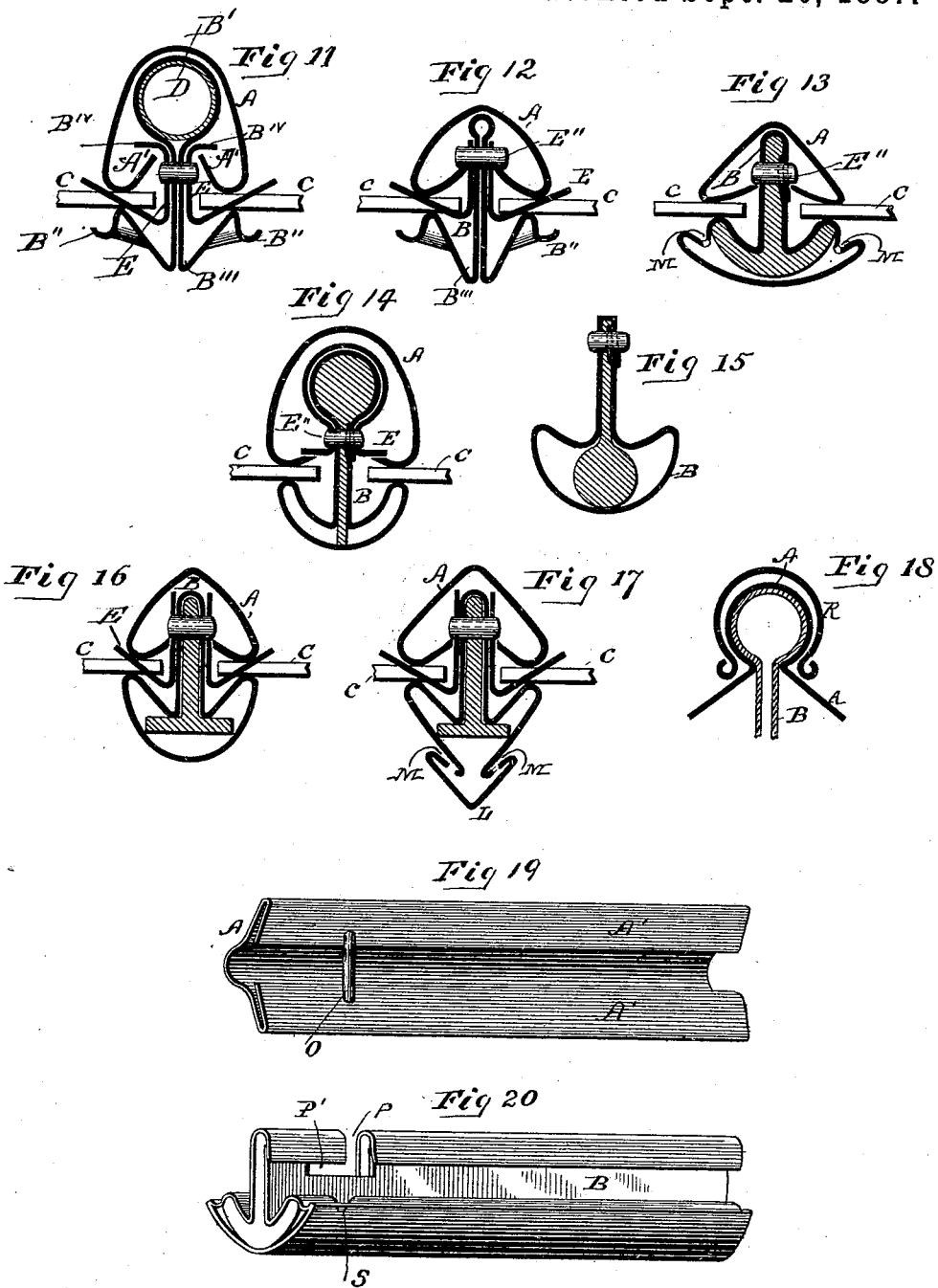

United States Patent Office.

MALCOLM MACLEOD, OF PHILADELPHIA, PENNSYLVANIA.

JOINING-BAR FOR UNITING GLASS AND OTHER PLATES.

SPECIFICATION forming part of Letters Patent No. 370,075, dated September 20, 1887.

Application filed April 28, 1887. Serial No. 236,524. (No model.) Patented in England September 14, 1886, No. 11,637.

*To all whom it may concern:*

Be it known that I, MALCOLM MACLEOD, engineer, a subject of the Queen of Great Britain, and a resident of Philadelphia, Pennsylvania, have invented an Improvement in Joining-Bars for Uniting Glass and other Plates, (for which invention I have filed a provisional specification for British Letters Patent for fourteen years from the 14th day of September, A. D. 1886, the latter being the date of the certificate of filing, and numbered 11,637;) and I do hereby declare the following to be a full, clear, and exact description of the invention, reference being had to the annexed drawings, making part hereof.

The nature of my invention will fully appear from the following specification and claims. It has for its object most particularly the union or joining of glass plates in greenhouses, whether for roofs or sides, and is intended to be substituted for the old form of glazing. It is used in the art which is called "dry glazing," in distinction to the method of using putty and other cements to make or fix the joints. My device may also be used to form the joints to unite plates of sheet metal of various kinds, and plates of other material, as will appear from the following description.

Figure 1:
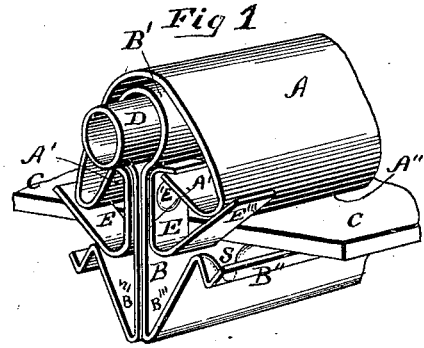

In the drawings, Sheet 1, Figure 1, is a broken-off perspective view of my device. Figs. 2 to 10, inclusive, are modifications thereof, which will be more fully described by lettering. Sheet 2, Fig. 11, is a vertical cross-sectional view of Fig. 1. Figs. 12 to 20, inclusive, represent modifications, which will be described hereinafter.

In Fig. 1 A is a long cap or hood, the lower edges, A', of which are bent inward and upward. The edges of the bends impinge against the upper surfaces of the glass plates. The caps in all the various forms bear a general resemblance to each other, the only differences being in the modes of securing them to the interior parts. This is invariably done by means of the bent-in portions which form lips A'. B is a glazing-bar, the lower parts of which are bent upward and outward and impinge at the upper part of the bent portions against the lower surfaces of the glass plates. The upper edges of these bent portions are also bent downward and again upward, the outer edges not quite touching the plates. They thus form channels B" to receive the condensation of vapors from the lower surface of the glass. The lower bends, B''', also form main channels or troughs to receive moisture which may drip from above through the joint formed at A" with the glass plates. C C are the glass plates. The upper part of glazing-bar B is bent around into almost a complete tube or crown, B'. D is a strengthening or stiffening tube of iron inserted in the rounded part B' of the bar B. E is a bracket, beneath the upper outwardly-turned lips of which the inner bent-up edges, A', of the cap A abut. These brackets E are riveted at intervals throughout the length of the bar by rivets E'. They also prevent the glass from sliding out of place when the bar is complete and in use.

Figure 2:
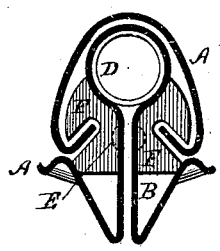

In Fig. 2 F F represent two wings or flaps on the outer edges of two small ears, (with which they are integral, respectively,) which ears (see Fig. 10) are riveted through the bar B, similarly to bracket E. These flaps F serve the same purpose as bracket E, Fig. 1.

Figure 4:
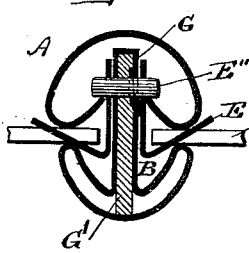

In Fig. 4 the bar B is shown in an anchor shape in cross-section, being bent double-walled throughout, the two long edges overlapping at G. A re-enforcement or stiffening strip, G', is inserted, as shown. The rivet E'' here serves the purposes of securing the bracket E, the strengthening-bar, and bar B together, and by its projecting ends also engages the cap A and holds it down in place.

Figure 5:
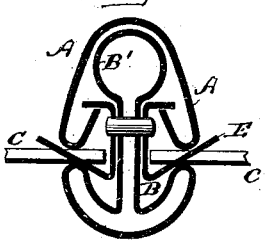

In Fig. 5 the construction is somewhat similar to that shown in Fig. 4, excepting that the anchor form terminates above in a rounded crown and the upper ends of stop E are bent outward, as in Fig. 1.

Figure 6:
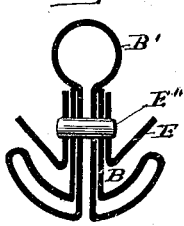

In Fig. 6 the cap A is not shown, and the bar B is bent into the round-crown form B' in the middle, then downward and outward, retaining and forming the anchor shape, and then bent upward against the sides of the former bend and bracket E, and the downward and upward laps are riveted together. Bracket E only forms a stop to the glass in this construction.

Figure 7:
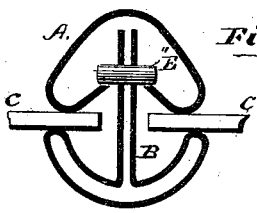

In Fig. 7 the bar B is bent into the anchor form along its middle, the parts near its edges projecting upward, terminating within cap A, the rivet-stop E'' being used, as shown.

Figure 8:
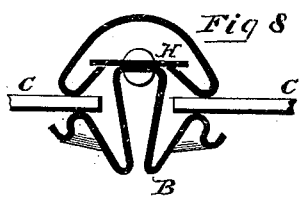

In Fig. 8 the bar B is bent so that its middle part forms a long flat crown or top, the sides being bent downward, then upward to form a channel for the drip from without. Short strips H are riveted along its crown at intervals to answer one purpose subserved by bracket E in Fig. 1—viz., to hold the cap down.

Figure 9:
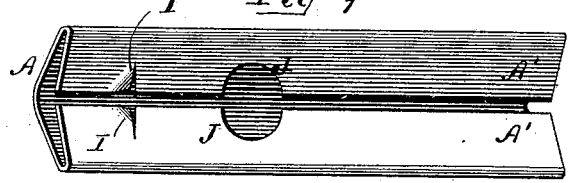

Fig. 9 represents a short length of cap A, the inner edges of each inwardly-bent part A' being provided with a half-circular cut-out space, J J, in bent-in part A' A', adapted to receive the two heads of a rivet, E'', as shown in Fig. 7. I I are two bent-in corners of cuts in the edges of parts A' A'. The middle web of bar B is inserted in the opening between parts A' A', and the rivet-heads enter the enlarged opening J J. Cap A is then pushed forward until the rivet-heads abut against the bent-in corners I I, which act as checks to the further sliding of the cap. The heads of the rivet thus impinge against the bent-up edges of cap A and hold the latter down, as shown in cross-section in Fig. 7.

Figure 10:
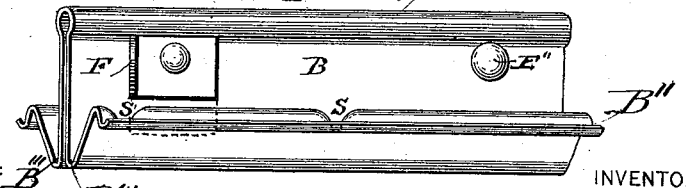

Fig. 10 is a perspective view, slightly modified in size, of the cross-sectional view shown in Fig. 2, omitting the cap A. The flaps F, Fig. 2, enter the cap A by means of two corresponding slots in the bent portions F F, and the cap A is then pushed forward and is held down by the flaps F F engaging with the bent portions A' A', all in a manner substantially the same as that described of rivet E'' in Figs. 7 and 9.

On Sheet 2, Fig. 11 is a cross-sectional view of Fig. 1, already described. Fig. 12 is substantially the same, with the exception that the brackets E E do not hold down the cap, this office being performed by the enlarged heads of the rivet E'', which enter the cap in the manner described of the rivet in Fig. 7.

Fig. 13 is substantially the same as Fig. 4, excepting that the strengthening-bar is anchor-shaped in cross-section, the bracket E is omitted, and the bar B extends around the strengthening-bar and is bent along its sides to form channels to receive the condensation from the lower surface of the glass. When the strengthening-bar is omitted, as is often the case, small holes are pierced in the bottoms of the condensation and drip channels B'' and B''' to allow the moisture to pass out, though I have in Fig. 13 shown the strengthening-bar in place and the small holes only appear in the outer drip-channels—that is, when the bar B is double shell.

Fig. 14 shows the bar B in the above-described anchor shape with a round crown and strengthening-bar, the bracket E being passed around the crown of the bar and brought down, its two lower ends projecting outward and holding the inner bent edges of the cap A beneath them. A rivet, E'', passes through the bracket above the turned-out portions and through the intermediate bar, holding them all together.

In Fig. 15 the cap is omitted, the bar B is anchor-shaped, and a bulb strengthening-bar is used. The edges of the bar B are overlapped and are pierced by a rivet, which holds them and the whole bar and strengthening-bar together. This rivet is long enough to engage with the cap and hold it in the manner described of the rivet in Fig. 7.

In Fig. 16 the bar B is in anchor shape, provided with an inverted-T-shaped strengthening bar. The bracket E does not hold the cap down, but simply serves to check the glass plates from sliding. A long rivet passes through the upper part of the brackets and the intermediate upper parts of the bar B and strengthening-bar, holding them all together. This rivet also serves to receive and hold down the cap A, as above described.

In Fig. 17 the bar B may be said to be anchor-shaped, as already described, with a supplemental dependent harpoon-shaped head, L, the upwardly and outwardly projecting barbs of which form channels M M to receive and carry off the condensation from the lower surfaces of the glass plates. The rest of its construction is substantially the same as that shown in Fig. 16.

In Fig. 18 is shown a form of cap A which in cross-section has a round crown with flaring downwardly-slanting sides. The bar B terminates in a round crown over which the cap is sprung. When in place, horseshoe-shaped springs R are clasped around the crown of the cap, the ends of the spring engaging in the neck formed between the cap and its crown. These springs serve to compress this neck of the cap into place against the bar B and to hold it there.

Figure 3:

In Fig. 19 the two inwardly-bent parts A' A' of the cap A are connected by a short cross-rod, O. This cap is adapted to cover the bar B shown in Fig. 20. In this latter figure the bar B is of similar construction to that shown in Fig. 13 in end view, excepting that the rivet E'' is omitted, the cap being held down by means which I will now describe. Its upper edge is provided with the ⌐-shaped groove or slot lettered P P'. When it is desired to adjust the cap shown in Fig. 19 to this bar, the cap is set on so that rod O enters the verticel part P of the groove. The cap is then pushed along until the rod sliding in part P' of the slot reaches the extremity thereof, when the cap will thereby be locked in place. A cross-sectional view of the cap in Fig. 19 is shown at Fig. 3 of Sheet 1. In Fig. 1 of Sheet 1 the interval arrangement is not shown; but the bar B is provided at intervals of its whole length with brackets E, and the turned-out portions B$^{IV}$ (see Fig. 11, Sheet 2) of these brackets enter the caps by means of enlargements similar to those shown at J J, Fig. 9, Sheet 1. When they have so entered, the cap A is pushed along until the parts B$^{IV}$ engage above the narrower parts of the opening in the lower part of the cap and are checked by the depressions I I. (See Fig. 9.) It will thus be seen that the connection of the cap with the bar B and its locking thereupon is in all cases effected by a joint or attachment much resembling that which connects a bayonet with the gun, and for brevity I shall hereinafter in my claims call this system of attachment a "bayonet-joint," as a general term to cover the various forms.

Depressions S S S (shown in Figs. 1, 10, and 20) are outlets from the condensation-channel B″ into the main channel B‴ to permit the water in the former to flow into the latter. In the forms shown in Figs. 13 and 17 I have lettered the condensation-channels M M, and in these cases the bottoms of these channels are pierced at intervals with holes or drains to permit this flow into the main or lower channels.

I have shown various forms of my device which are to be used in different parts of the same building. Some forms being stronger than others are for roofs and flooring, others being lighter are to be used for sides or vertical parts of the building.

The various methods of securing the cap to the bar (shown in Figs. 1, 2, 5, 7, and 8, or any two or more of them) may be used on the same bar, as necessity may require. Fig. 10 shows the wing F as well as the pivot E″, though the cap is not shown as adapted to receive the latter.

In my claims I shall designate the bar B, to which the cap A is joined, as the "carrying-bar," since it carries the cap and sustains the plates. It will be observed that by my device the top of the cap is an unbroken surface free from screw or bolt holes, thus excluding moisture. The inwardly and upwardly turned edges A′ A′ of the cap insure a spring-pressure on the glass or other plate used, the material used for my bar being sheet metal. Heretofore bolts and screws have been passed through the caps to secure them to the carrying-bars, thus weakening them, as well as giving an opportunity for moisture to pass into the interior. The opening between the edges of the inwardly-bent parts A′ A′ may be called a slot.

The hollow strengthening-bar D combines lightness with strength, and end-to-end lengths of it can be easily joined together by male and female threads in the manner well known to mechanics.

I have used the terms "strengthening-bar" and "stiffening-strip" to designate the same part. I do this because this bar or strip serves both purposes—viz., to strengthen and to stiffen the parts in which it is inserted.

It will be observed that the outer or condensation channel is supplemental to the main channel, and is continuous from end to end of the joining-bar, and the drains S pass from this distinct channel to the space above the main channel. By this means I catch every drop of condensation from the lower or inner surface of the glass. This condensation will first run into the outer continuous channel and will then be conducted by the drains within to the main channel, which is of course also continuous.

The office of the tube, bar, or strip D is solely to strengthen and stiffen the structure, and passes from end to end of each bar B, beginning outside of or above the line of the junction of the glass with the bar B, and terminating outside of said line.

I am aware that thin tubes have heretofore been used in joining-bars for heating and ventilating; but these have been arranged to communicate for their whole length with the interior, and are set inside the lines of junction of the glass plates with the joining-bars, so I do not claim these.

What I claim is—

1. In a joining-bar for uniting and sustaining plates, the combination of a cap, A, and carrying-bar B, the two being joined or united by a bayonet-joint and adapted to hold the edges of the plates between them, substantially as described.

2. In a joining-bar for uniting and carrying plates, the combination of a cap, A, provided with inwardly-turned edges A′ A′, and a carrying-bar, B, to which latter the cap is attached by a bayonet-joint, which consists of a long slot with an enlarged opening in one part adapted to receive a lateral projection on the other, which projection, as the parts are slid one upon the other, engages with the inner edges of the slot and joins the parts, substantially as described.

3. In a joining-bar for uniting and carrying plates, the combination of a cap, A, provided with inwardly-turned edges A′ A, and a carrying-bar, B, to which latter the cap is attached by a bayonet-joint, which consists of a slot with an enlarged opening in the cap and a laterally-projecting lug on the carrying-bar, whereby the joint is formed by the entry of the lug into the enlarged opening and the sliding of the parts one upon the other to engage the lug over the edges of the slot, substantially as described.

4. In a joining-bar for uniting and carrying plates, the combination of a cap, A, provided with inwardly-turned edges A′ A′, and a carrying-bar, B, to which latter the cap is attached by an internal bayonet-joint, and the bracket E, secured to the carrying-bar and adapted to act as a check or stop to the plates C C and as a lug to enter the slot of the cap to unite the cap and carrying-bar together, substantially as described.

5. In a joining-bar for uniting and carrying plates, the combination of a cap, A, provided with inwardly-projecting edges A′ A′, and a carrying-bar, B, to which latter the cap is attached, and the bracket E, secured to the carrying-bar and adapted to check or stop the sliding of the glass or other plates, C C, substantially as described.

6. In a joining-bar for uniting and carrying plates, the combination of a cap, A, provided with inwardly-projecting edges A′ A′, and a carrying-bar, B, to which latter the cap is attached by a bayonet-joint, which consists of a slot in the lower side of the cap with an enlargement at one part and a long rivet or projection, E″, from the bar B, which latter is adapted to enter the enlargement of the slot and engage over the edges of the slot as the parts are slid one upon the other, substantially as described.

7. In a joining-bar for uniting and carrying plates, the combination of a cap, A, provided with inwardly-projecting edges A' A', and a carrying-bar, B, to which latter the cap is attached by a bayonet-joint, and a check, I, in the path of projection E'', to obstruct the sliding of the parts one upon the other at a desired point, substantially as described.

8. In a joining-bar for uniting and carrying plates, the combination of the cap and the carrying-bar, the latter being provided with a lower main drip-channel and an upper continuous side drip-channel, and the drains S between the two channels, whereby the water from the upper side channel will flow into the lower main channel, substantially as described.

9. In a joining-bar for uniting and carrying plates, the combination, with the carrying-bar B, of the main drip-channel B''' and the edge channel, B'', to receive condensed moisture, and cross-channels or outlets S S to permit the condensed moisture to flow into main channel B''', substantially as described.

10. In a joining-bar for uniting and carrying plates, the combination of a cap, A, and carrying-bar B, the two being joined one to another, said bar B being provided with a round hollow crown, B', above or outside of the line of junction of the glass plates with the bar, and a tube or bar, D, inserted in said crown, also above the line of junction of the plates and bar, to strengthen and stiffen the construction, substantially as described.

MALCOLM MACLEOD.

Witnesses:
GEORGE E. BUCKLEY,
WM. H. CARSON.